(12) United States Patent  
Katakamsetty et al.

(10) Patent No.: US 9,064,084 B2  
(45) Date of Patent: *Jun. 23, 2015

(54) TOPOGRAPHY DRIVEN OPC AND LITHOGRAPHY FLOW

(71) Applicant: GLOBALFOUNDRIES Singapore Pte. Ltd., Singapore (SG)

(72) Inventors: Ushasree Katakamsetty, Singapore (SG); Yang Qing, Singapore (SG); Wee Kwong Yeo, Singapore (SG); Chiu Wing Hui, Singapore (SG); Shyue Fong Quek, Singapore (SG); Valerio Perez, Singapore (SG)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,295

(22) Filed: Apr. 24, 2014

(65) Prior Publication Data

US 2014/0282300 A1    Sep. 18, 2014

Related U.S. Application Data

(63) Continuation-in-part of application No. 14/157,530, filed on Jan. 17, 2014.

(60) Provisional application No. 61/781,291, filed on Mar. 14, 2013.

(51) Int. Cl.  
*G06F 17/50* (2006.01)

(52) U.S. Cl.  
CPC ........ *G06F 17/5081* (2013.01); *G06F 2217/12* (2013.01)

(58) Field of Classification Search  
USPC .............................. 716/50, 51, 52, 53, 54, 55  
See application file for complete search history.

(56) References Cited

U.S. PATENT DOCUMENTS

| | | | | |
|---|---|---|---|---|
| 6,893,800 | B2 * | 5/2005 | Jessen et al. | 430/311 |
| 8,024,675 | B1 * | 9/2011 | Gupta et al. | 716/54 |
| 8,079,005 | B2 * | 12/2011 | Lai et al. | 716/111 |
| 2007/0174793 | A1 * | 7/2007 | Watanabe | 716/1 |

* cited by examiner

*Primary Examiner* — Brian Ngo  
(74) *Attorney, Agent, or Firm* — Horizon IP Pte. Ltd.

(57) ABSTRACT

Enhancements in lithography for forming an integrated circuit are disclosed. The enhancements include a topography analysis of a design data file to obtain accumulative topography information for different mask levels. The topography information facilitates topography driven optical proximity correction and topography driven lithography.

22 Claims, 8 Drawing Sheets

○ Lithography critical feature placed at Low, Medium and High topography regions
○ Best Focus is derived from FEM (Focus Exposure Matrix) analysis
○ Topography variation leading to systematic shift in Best Focus PWQ for Low Topo, Medium Topo1,
Medium Topo2 and High Topo

TOPOGRAPHY DRIVEN OPC AND LITHOGRAPHY FLOW

CROSS-REFERENCE TO RELATED APPLICATIONS

This application is a continuation-in-part application of co-pending U.S. patent application Ser. No. 14/157,530, filed on Jan. 17, 2014, which claims the priority benefit of U.S. Provisional Application Ser. No. 61/781,291, filed on Mar. 14, 2013. All disclosures are incorporated herewith by reference in their entireties.

BACKGROUND

Fabrication of devices involves the formation of features on a substrate that make up circuit components, such as transistors, resistors and capacitors. The components are interconnected, enabling the device to perform the desired functions. The components and interconnections are formed in numerous layers. Lithography is used to form patterns on the different layers. For example, an exposure source exposes a resist layer using a mask or reticle containing the desired patterns. The resist is developed after exposure, forming a resist mask with the pattern of the reticle. An etch is performed using the resist mask as an etch mask, transferring the pattern to the underlying layer or layers. Numerous masks may be used in the fabrication process of devices.

A mask may contain patterns which are lithographic weak points. Lithographic weak points impact the integrity of the pattern transfer process. The patterns which are weak points need to be enhanced or fixed so that the integrity of the pattern transfer process is not impacted. We have discovered that conventional pattern enhancement techniques are inadequate, particularly with advanced nodes.

Therefore, there is a desire to provide improved pattern enhancement to improve pattern transfer integrity.

SUMMARY OF THE INVENTION

Embodiments generally relate to forming a device, such as an integrated circuit (IC). Embodiments of forming a device include a design or lithographic enhancement process involved in the process of forming a device. The method of forming a device may include a lithographic enhancement process and a system for pattern enhancement.

In one embodiment, the process for forming a device includes providing a design data file of an IC. A topography analysis is performed on the design data file, wherein the analysis includes generating topography maps for mask levels of the IC. The topography maps include topography regions. The process includes performing OPC on the design data file with topography information from the topography analysis. The OPC adjusts patterns of the mask levels based on defocus values associated with topography regions, and the OPC produces an adjusted design data file. A mask set is generated from the adjusted design data file and used to process a wafer to form devices.

In another embodiment, a process for forming a device includes providing a design data file of an integrated circuit (IC) and generating a mask set from the design data file. A topography analysis is performed on the design data file. The topography analysis includes generating topography maps for the mask levels of the IC. The topography maps include topography regions. An optical rule check (ORC) simulation is performed on the design data file with topography information from the topography analysis. The ORC determines topography hotspots based on topography of the respective mask levels. A process window qualification (PWQ) is performed using the topography information to determine process parameters for the mask levels based on the topography hotspots, wherein the process parameters include best focus conditions and other lithographic process parameters. A wafer is processed to form devices using the mask set and process parameters from PWQ.

In yet another embodiment, a method for making a mask set is disclosed. The method includes providing a design data file of an IC. A topography analysis is performed on the design data file. The analysis includes generating topography maps for the mask levels of the IC. The topography maps include topography regions. OPC is performed on the design data file with topography information from the topography analysis. OPC adjust patterns of the mask levels based on defocus values associated with topography regions. An adjusted design data file is produced by OPC. A mask set is generated from the adjusted design data file.

In another embodiment, a system for reticle enhancement of a design data file of an IC is provided. The system includes a topography module for performing topography analysis on the design data file. The topography analysis generates topography maps of the mask levels of the IC with topography regions. A binning module provides bin markers to the topography regions to the design data file to form a binned design data file. An OPC module is provided to perform OPC on the binned design data file. The OPC module adjusts patterns of the mask levels based on defocus values associated with topography regions and produces an adjusted design data file.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Embodiments generally relate to devices, for example, semiconductor devices or integrated circuits (ICs). The ICs can be any type of IC, such as dynamic or static random access memories, signal processors, microcontrollers or system-on-chip (SoC) devices. The devices or ICs can be incorporated into or used with, for example, consumer electronic products, such as computers, cell phones, and personal digital assistants (PDAs).

Figure 1:
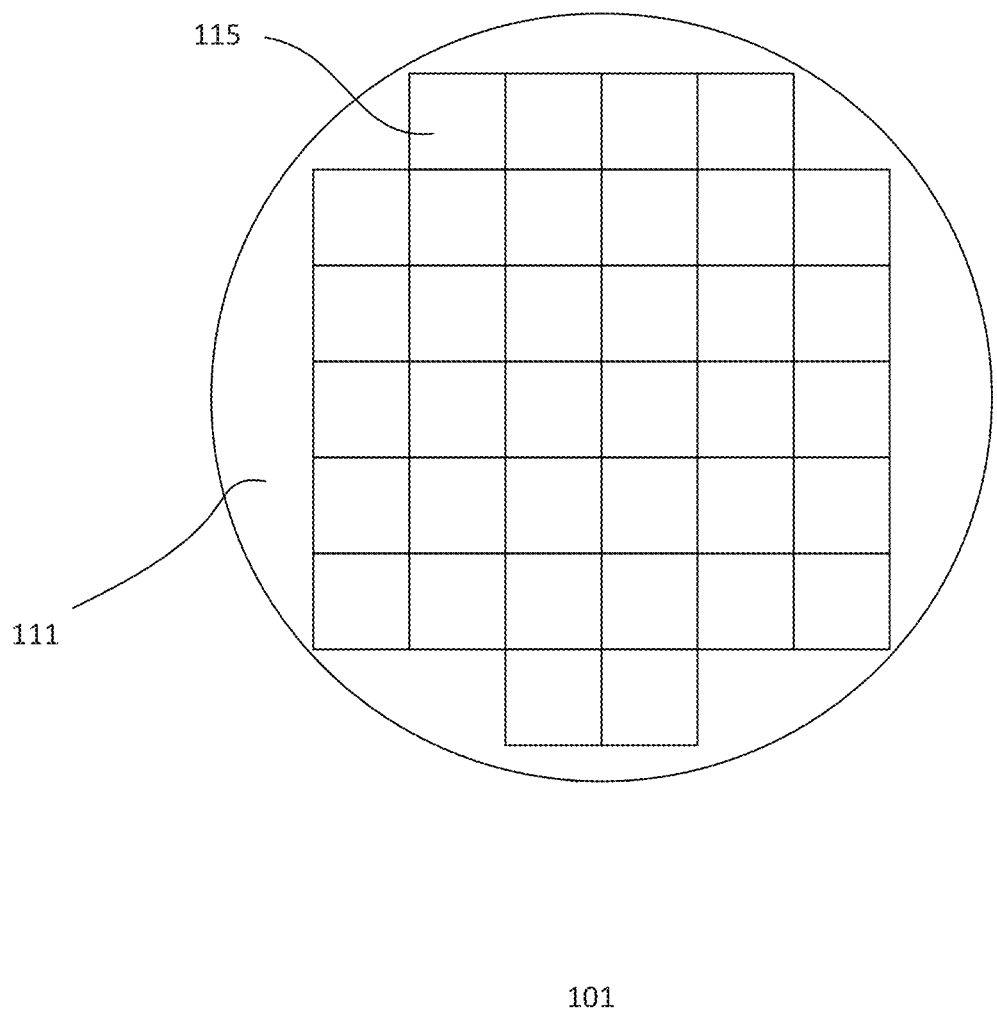
FIG. 1 shows a semiconductor wafer.

FIG. 1 shows a semiconductor wafer 101. The semiconductor wafer, for example, may be a silicon wafer. Other types of wafers are also useful. For example, the wafer may be a p-type, n-type, silicon-on-insulator or silicon germanium wafer. The wafer may include a notch (not shown) to indicate the crystal orientation of the wafer. Other techniques for indicating the crystal orientation may also be useful. Additional indicators may also be included to indicate the dopant type of the wafer.

The wafer includes an active surface 111 on which devices 115 are formed. A plurality of devices or dies may be formed on the wafer in parallel. The devices, for example, are arranged in rows along a first (x) direction and columns along a second (y) direction. The devices are subsequently singulated into individual dies, assembled and tested. In other embodiments, the wafer may include a single device.

The fabrication of devices, such as integrated circuits (ICs), involves the formation of features on a substrate that make up circuit components, such as transistors, resistors and capacitors. The devices are interconnected, enabling the device to perform the desired functions. Interconnections are formed by forming contacts and conductive lines in a dielectric layer using, for example, damascene techniques. The device features and interconnections are formed by repeatedly depositing and patterning layers on the wafer. Patterning, for example, includes lithography. For example, lithography includes exposing of a resist layer on the wafer (may or may not include one or more device layers) with an exposure source through a reticle or mask with a reticle pattern, development of the resist to transfer the reticle pattern to the resist, and etching, such as a reactive ion etch (RIE), to transfer the resist pattern to the wafer.

In forming ICs, numerous masks or reticles are used. For example, a mask set having numerous masks is used. Lithography is performed to transfer the reticle or mask pattern onto a resist layer. The patterned resist may be used for various purposes to create features on the substrate. For example, the patterned resist may be used as an implant or etch mask. In the case of implant mask, doped regions are formed in the substrate while an etch mask is used to form features on the wafer.

Planarization process, such as chemical mechanical polishing (CMP) process, may be performed. For example, CMP may be performed for planarization of, for example, dielectric and metal layers. Performing CMP on other types of layers may also be useful. The CMP process should provide a planar surface, both globally across the wafer as well as locally across a die. However, due to pattern density and line width variations in design as well as other processing issues, CMP does not always produce a planar surface. CMP, for example, may introduce planarity changes, surface topography changes, dishing and erosion, among others.

The information of the mask set or design layers may be provided in or contained in a design data file. For example, the layout or mask information of the masks used in the fabrication of an IC is provided in a design data file. A mask set may be ultimately created based on the design data file. The design data file may be an artwork file, containing information of the IC, such as the layout of the features of the various masks of the mask set. The design data file, for example, can be a GDSII format file. Providing design data files in other formats may also be useful. For example, the design data file may be in an OASIS format or place and route databases, including open access or Milkyway from Synopsys. Other suitable formats may also be useful.

Figure 2:
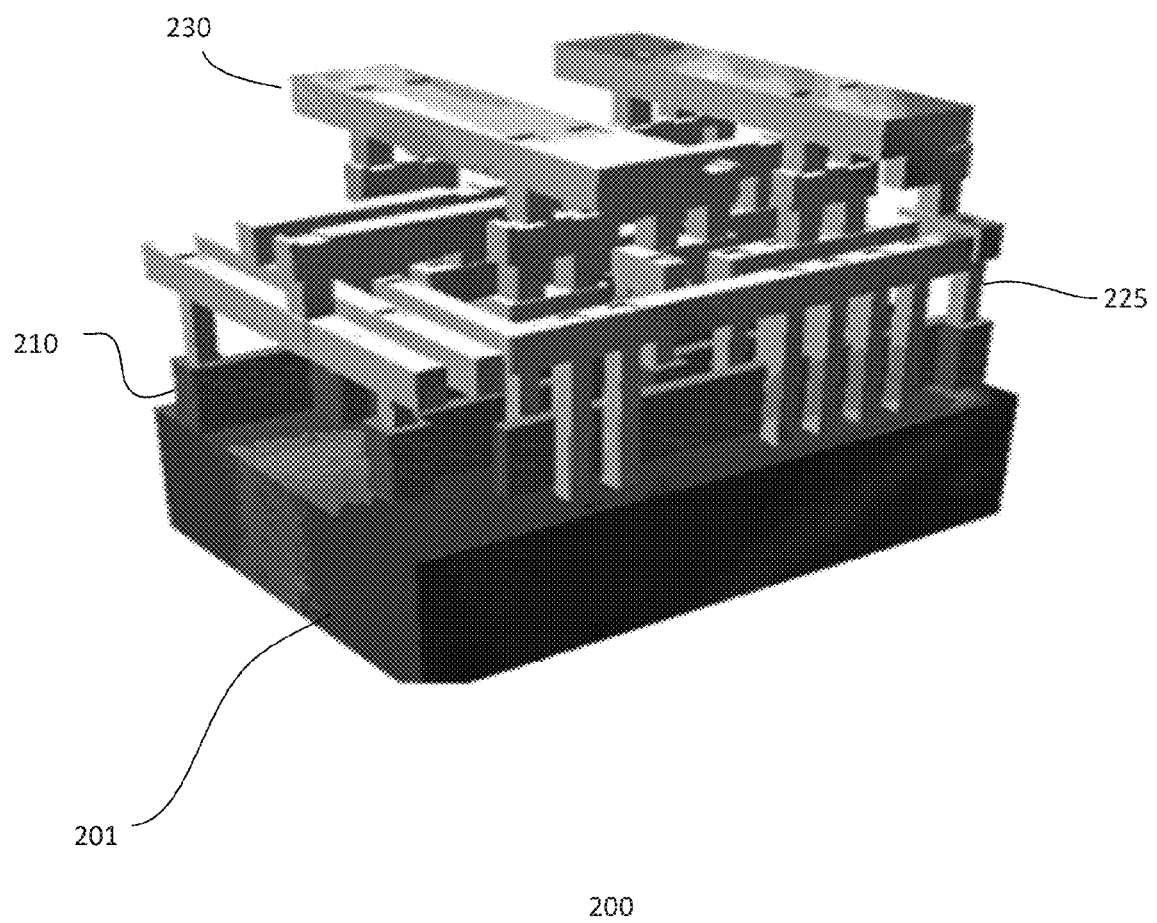
FIG. 2 shows a 3-dimensional view of an exemplary portion of a device in GDSII format.

FIG. 2 illustrates a 3-dimensional view of an exemplary portion of a device 200 in GDSII format. The portion, for example, may be a cell of a device. The view (e.g., GDSII view) shows a substrate 201 with a patterned polysilicon layer 210 which forms polysilicon lines. The polysilicon lines, for example, represent gate electrodes of transistors. Three metal layers 230 are provided in the cell. Providing other number of metal layers may also be useful. The metal layers are coupled to the substrate and gates by contacts represented by posts 225. Other types of levels may also be useful.

A mask set is provided to form an IC. To form a plurality of ICs in parallel on the wafer, the lithographic system repeatedly exposes the wafer with the reticle, which corresponds to a plurality of ICs. After completion of processing the wafer, it is diced to singulate the plurality of ICs.

In the design process, different parties, groups or entities may be involved in the development to complete the full device. For example, a first party may develop a plurality of IP modules. The first party, for example, is an IP provider. For example, the IP provider may be a foundry. Other types of IP or service providers may also be useful.

A module, for example, contains circuitry for performing a specific function. The complete layout information of a module is contained in an artwork file. For example, the artwork file contains component layout, interconnects, pin definitions and pin labels. The artwork file, for example, may be a GDSII file. Providing artwork files in other formats may also be useful. Different modules may be provided to perform different functions. The different modules, for example, are contained in respective artwork files.

The modules may be provided to a second party for use in designing a full device or chip. The second party, for example, may be an end user or customer which designs the full chip according to the available modules. Such end user may be an IC design company. For example, modules may be selected and combined, including interconnections according to the desired functions. The design and layout of the IC may be merged into a single artwork file. In other embodiments, a full chip may be provided in a single artwork file. For example, the full chip may have options for which the second party may select to perform the desired functions.

The design file containing the design data may be enhanced for lithography. For example, lithography enhancements may be performed on the design data. The patterns of the design data may have lithographic pattern weak points. For example, some patterns on the mask may not be accurately printed on the wafer. Weak points may occur due to, for example, feature miniaturization in advanced nodes, narrowing of lithography exposure window and process variations. Lithographic enhancements on the design data are to correct or fix the lithographic weak points in the patterns early in the design process. The lithographic enhancements are performed by the second party, such as the IC design company. The enhanced design data may be provided to the first party, such as the foundry. Enhancements may be performed on an electronic design automation (EDA) tool. EDA tools may include analog or mixed signal custom layout generation tools as well as digital place and route tools, such as those from, for example, Synopsys, Cadence or Mentor Graphics. Other types of EDA tools may also be useful.

Figure 3:
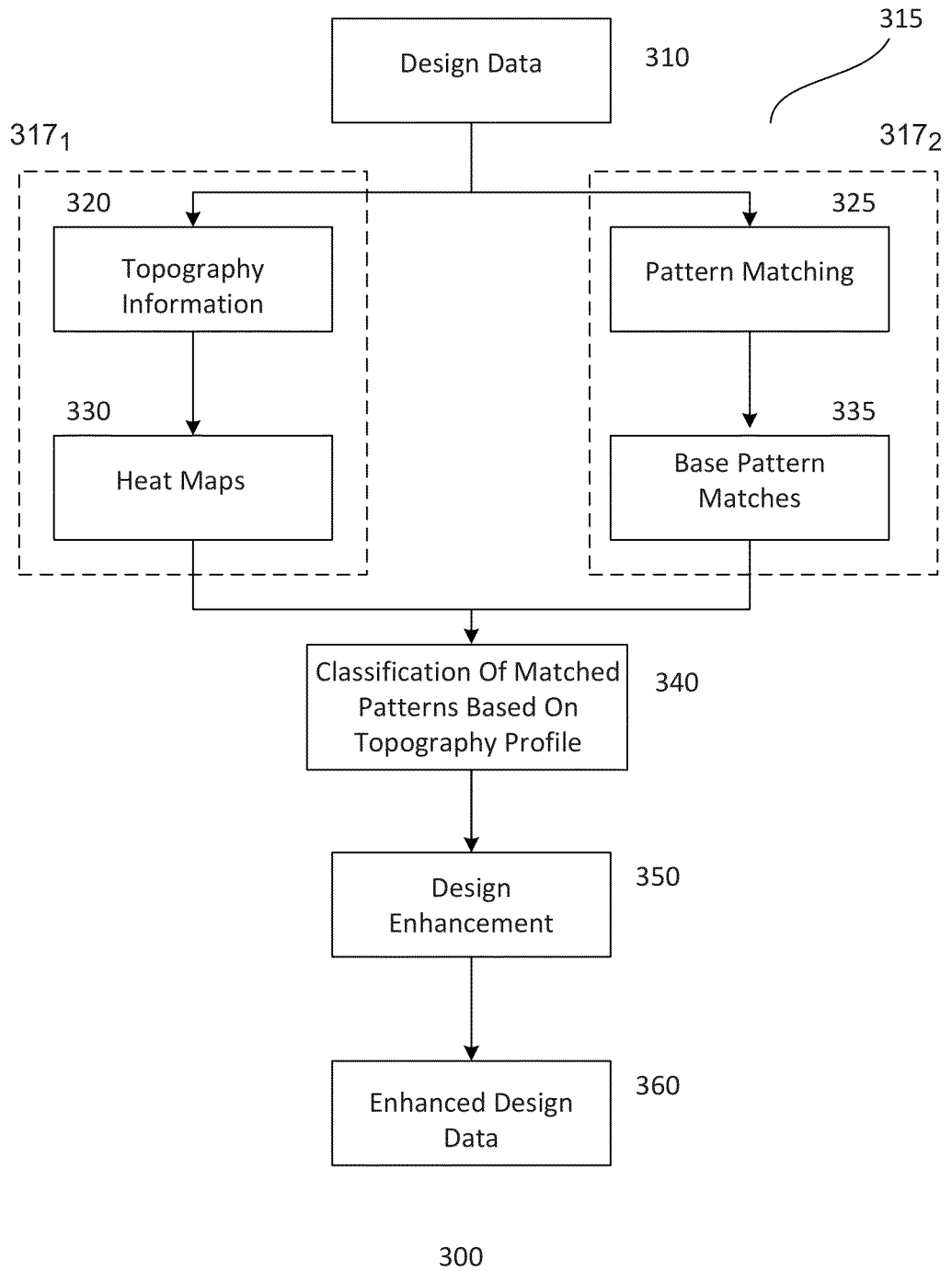
FIG. 3 shows an embodiment of process enhancement of a design file of a device.

FIG. 3 shows an embodiment of a design or lithographic enhancement process 300. The enhancement process, for example, may be performed by an EDA tool. As shown, a design data file is provided at step 310. The design data file, for example, is an artwork file of a device. The artwork file includes the layout of the device at the various mask levels. For example, a mask set with numerous masks for fabricating an IC is derived from the artwork file. The artwork file may be a GDSII format file. Other types of design data files, such as place and route databases, including open access or Milkyway, may also be useful.

The process performs initial analysis of the design data at step 315. The initial analysis includes first and second analyses $317_1$-$317_2$. The first analysis $317_1$ includes a topography analysis at step 320. The topography analysis determines topography information of the design layers corresponding to the masks of the IC or device. For example, a design layer is a layer on which a resist layer is formed. A design layer may be a bare wafer or one or more layers on a wafer. The resist layer is exposed using a mask of the mask set. In the process to form the device, there may be x design layers. The x design layers are exposed by masks of the mask set. For example, a design layer is associated with a mask. Each time a mask is used, it may be referred to as a mask level. For example, x design layers correspond to x mask levels. In some instances, a mask of a set may be reused for another layer. For example, a mask may be used for more than one mask levels or design layers. In such case, even though it may be the same mask, the layers or levels are different. In other words, a mask set may have less than x masks used for x design layers.

The topography analysis, in one embodiment, determines accumulated topography information of the design layers or mask levels of the device. For example, the topography analysis determines accumulated topography information of each design layer of the device, such as from layer 1 to layer x. In one embodiment, the topography analysis determines accumulated topography information of topography affected design layers or mask levels, such as from layer 1 to layer T of the T topography affected design layers or mask levels.

A simulation may be performed using a silicon calibrated CMP model to determine accumulated topography information of a layer. The simulation, for example, generates topography profile of the layers. The CMP model may be provided by the foundry to the IP provider or SoC designers. For example, the CMP model may be provided by the foundry based on actual CMP information. Other techniques for obtaining the CMP model may also be useful.

The CMP simulation generates topography profile for the die at different mask levels. The CMP simulation generates topography profile for each mask level. In one embodiment, the CMP simulation generates topography profile for topographically affected mask levels. For example, the CMP simulation generates topography profile for each topographically affected mask level. The topography profile is the profile of the actual surface variations on the wafer or design layer after CMP for the exposed mask layer. The topography profile, in one embodiment, is an accumulated topography profile. For example, an accumulated topography profile of a design layer associated with the $n^{th}$ mask level includes the topography effects of the layers up to the $n^{th}$ level, where n is from 1 to x or from 1 to T.

The die of a mask level are categorized based on its height relative to a nominal or baseline height. For example, regions on the die of a mask level are categorized based on its height relative to the nominal height. The classification, for example, is based on the topographical height in each region relative to the baseline height. In one embodiment, the regions are classified into 5 categories. Providing other number of categories or classification granularities may also be useful. The categories are shown in table 1 below:

TABLE 1

| Classifications |
| --- |
| Critically High Region |
| High Region |
| Medium Region |
| Low Region |
| Critically Low Region |

In one embodiment, at step 330, heat maps are generated for the different mask levels. For example, heat maps are generated for each simulated mask level. A heat map is a color-coded map of the die based on topography classifications. Table 2 below shows an exemplary color code for topography classifications:

TABLE 2

| Classifications | Color Code |
| --- | --- |
| Critically High Region | Red |
| High Region | Dark Yellow |
| Medium Region | Bright Yellow |
| Low Region | Green |
| Critically Low Region | Blue |

Using other colors to represent different classifications may also be useful. Preferably, the colors should be easily distinguishable from each other. Other techniques to represent different classifications may also be useful. Heat maps are graphical representation of accumulated topography profile of a die at different mask levels. This enables a user to easily identify potential problem areas on the die.

As for the second analysis $317_2$, it performs a pattern analysis. For example, at step 325, the second analysis $317_2$ matches patterns of the mask to known problems or base patterns. The base patterns, for example, are contained in a pattern library. The base patterns are known problem patterns or lithographic weak points. Such base patterns may be derived from historical data or information. In one embodiment, pattern matching is performed for a design layer associated with a mask level. For example, patterns of each design layer is analysed to determine which patterns match base patterns. Patterns on a layer which match base patterns are provided in a matched file. A layer may be systematically analyzed to ensure all patterns are processed. The analysis is repeated for processing other design layers. For example, the analysis is repeated for each design layer associated with a mask level.

In one embodiment, patterns of a design layer or mask level which match base patterns are stored in a matched file for the mask level at step 335. In one embodiment, each design layer is analysed to provide matched patterns in its respective layer matched file. For example, each pattern matched file contains a list of patterns of its respective layer which matches base patterns. The information contained in a pattern matched file includes the pattern identification and location of the pattern. For example, an entry in the list includes the type of pattern and its x-y coordinates on the die. Other types of information related to the pattern may also be included. For example, other information which identifies the pattern, such as necking or pinching patterns, may also be useful.

The process continues to enhance the design data file. Design enhancement includes enhancing matched patterns in the design data file. For example, the matched patterns of the different mask levels are enhanced. In one embodiment, design or pattern enhancement takes into account topography information from the topography analysis.

In one embodiment, design enhancement includes classifying matched patterns at step 340. For example, matched pattern classification is performed. In accordance with one embodiment, matched pattern classification includes classifying a matched pattern based on topography profile. As previously discussed, die regions are categorized based on its topography. A topography classification is assigned a weight value based on its height. Table 3 below shows an exemplary weighting of topography categories:

TABLE 3

| Classifications | Weight |
| --- | --- |
| Critically High Region | 5 |
| High Region | 3 |
| Medium Region | 1 |
| Low Region | 2 |
| Critically Low Region | 4 |

The weighting value ranges from 1-5 for five classifications. Other weighting values may also be useful. The weightages may be defined by, for example, the foundry. In one embodiment, the higher the weight, the more critical the topography region. For example, higher priority is given to higher weighted regions for enhancement or fix. More effort or higher priority may be associated with more critical topography regions than less critical topography regions. For example, the fixes for higher weighted regions may require more effort and are assigned higher priority than those of lower weighted regions. As shown, a critically high region is given the highest weight while a medium region is given the lowest weight. Also, a high region is given a higher weight compared to a low region. Assigning weight values to the different regions may be determined by, for example, the foundry. Other weighting systems may also be useful.

A matched pattern is given a weight according to the type of region in which it is located. For example, the x-y coordinates of the matched pattern is used to determine the topography classification for weight assignment. Matched pattern classification is performed for all matched patterns in the matched pattern files. For example, pattern classification may be performed layer by layer or level by level.

At step 350, design enhancement is performed on the design data. In one embodiment, enhancement priority is based on matched pattern classification. For example, higher priority is given to a matched pattern with higher weighting value. The enhancement or type of fix may depend on the type of pattern and weighting value. For example, the patterns may be necking or bridging patterns. In some cases, a library may provide or contain possible fixes based on pattern classification and type of pattern. For example, the EDA tool may include suggestions of possible fixes. Once enhancement is completed, an enhanced design data file is generated at step 360. The enhanced design data file includes enhancements based on matched pattern classification. The enhanced design data file, for example, is a GDSII file. Other types of formats may also be useful for the enhanced design data file.

The enhancement may be performed automatically or semi-automatically by the EDA tool. For example, the EDA tool may be provided with a mode selector for a user to select to operate the EDA tool either in the automatic enhancement mode or the semi-automatic enhancement mode. In the automatic enhancement mode, the EDA tool performs fixes automatically based on weighting. For example, matched patterns with higher weighting are given higher priority. The type of fix may be pre-selected by the foundry. The type of fix may depend on the weighting. In the semi-automatic mode, a user may select the type of fix for a matched pattern based on weighting.

The second party, such as the IC design company, for example, submits the enhanced data file to the first party, such as the foundry. The first party processes the enhanced data file. For example, the first party may perform design rule check (DRC), optical proximity correction (OPC) and optical rule check (ORC) on the enhanced design data file. After processing, a mask set may be generated based on the processed design data file. The mask set is used to process wafers in the fabrication of ICs.

Figure 4:
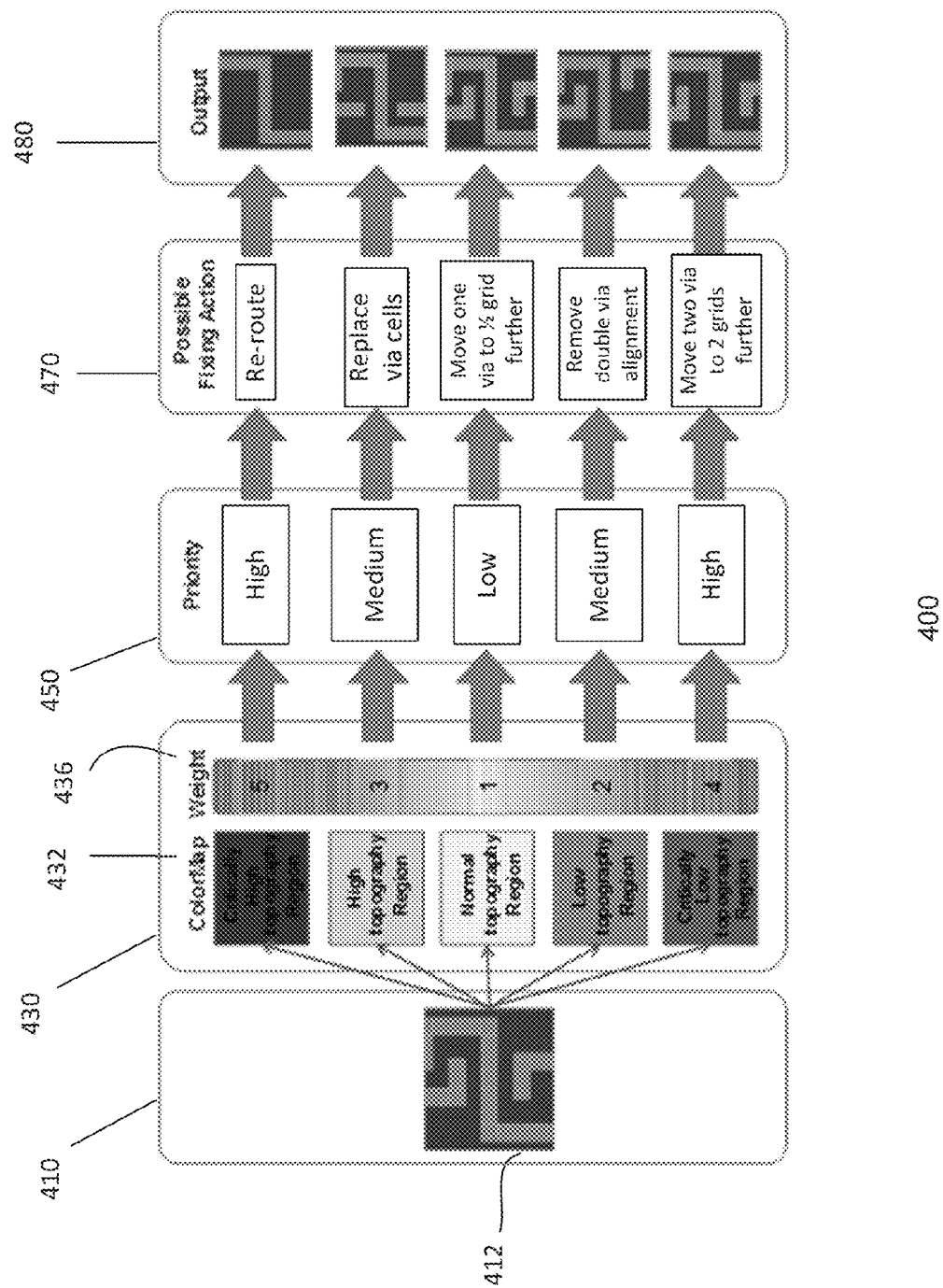
FIG. 4 shows an embodiment of an electronic design automation (EDA) environment for design enhancement.

FIG. 4 shows an embodiment of an EDA tool environment 400. The EDA tool includes various modules for performing topography classification and enhancements on design data. As shown, the EDA tool includes a pattern match module 410, a classification module 430, an enhancement summary module 450, an enhancement suggestion module 470 and an enhancement output module 480. Providing other or different modules may also be useful.

The pattern match module 410 displays patterns in the design file which match base patterns. For example, a matched pattern is displayed by the pattern match module 410. The matched pattern may be displayed one at a time. Other configurations of the pattern match module 410 may also be useful. For example, a user may select a matched pattern to display based on a list.

As shown, a pattern 412 is displayed. As for the classification module 430, it displays the weight classification of the selected pattern. In one embodiment, a color map corresponding to the topography classification is provided. For example, a color map 432 of the topography classification of the location of the selected pattern is displayed by the classification module 430. The weight value 436 of the selected pattern may also be displayed along with the color map. Other techniques for displaying or conveying the classification of the selected pattern may also be useful.

Based on the classification, the enhancement summary module 450 provides the user with information related to priority of the enhancement. Enhancement priority is based on the topography of the area in which a matched pattern is located. For example, the enhancement priority depends on the topography classification. In one embodiment, enhancement priority is related to weight value. For example, the higher the weight value, the higher the enhancement priority. As shown, weight values 4 and 5 have a high enhancement priority, weight values 2 and 3 have medium enhancement priority and weight value 1 has a low enhancement priority. Other enhancement classifications may also be useful. For example, matched patterns with higher enhancement priority are repaired or fixed before those with lower enhancement priority.

The enhancement suggestion module 470 may provide possible enhancements. The possible enhancements may depend on the enhancement priority level. Various factors, such as wiring congestion, timing constraints and design constraints, may determine the type of enhancements. For example, possible enhancements may include re-routing, replacing cells and relocating cells. Other types of enhancements may also be useful. The type of enhancement may depend on the priority level. For example, the higher the priority level, the more that is required to be changed with respect to the design data. The enhancement output module 480 provides a graphical representation of the enhancement.

The EDA tool may automatically provide enhancements based on weight. For example, the enhancement may be performed by the EDA tool without input from the user. The enhancements are performed based on, for example, weight and other factors. In such case, the output module displays the fix rendered by the EDA tool. Alternatively, the EDA tool may provide semi-automatic enhancements based on weight. The tool may provide suggested solutions for selection by the user. In some cases, the user may determine the type of fix to implement based on available fixes. Other configurations of the EDA tool may also be useful.

As described, lithography weak point pattern matching takes into account topography profile of the wafer surface. For example, lithography pattern matching is aware of topography profile (topography aware lithography analysis). The topography profile may be categorized and represented by colored heat maps. A color or category represents a topographical bin level, which is translated into weighting values added to the matched lithography patterns. The amount of fixing effort for a matched lithography pattern depends on its weight value. For example, the amount of fixing effort is customized to the topography profile of each area. This enables both lithography and CMP weak points (hot spots) to be detected and corrected at the layout design stage, improving design robustness during manufacturing.

Figure 5:
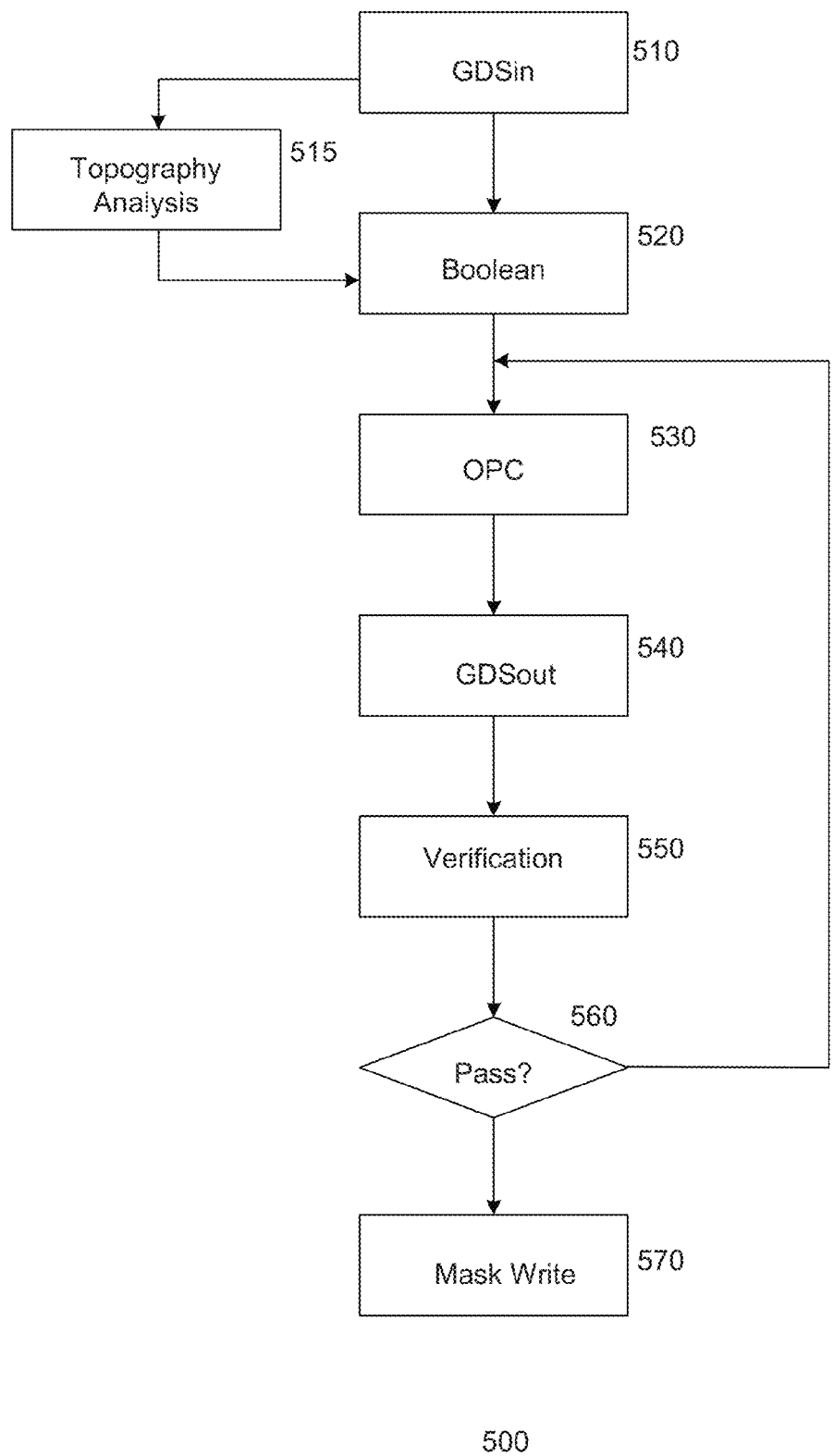
FIG. 5 shows an embodiment of a reticle enhancement (RE) process.

FIG. 5 shows an embodiment of a reticle enhancement (RE) process 500. At step 510, a design data file is provided. For example, the design data file is provided to the first party by the second party. The design data file contains information of the IC, such as the layout of the features of the various masks of the mask set. The design data file, for example, can be a GDSII format file. Providing design data files in other formats may also be useful. For example, the design data file may be in an OASIS format or place and route databases, including open access or Milkyway from Synopsys, may also be useful.

In one embodiment, the design data file is an unenhanced design data file. For example, enhancement as described in FIG. 3 has been omitted. Alternatively, the design data file is an enhanced design data file. For example, enhancement as described in FIG. 3 has been performed.

The design data file is analysed at step 515. In one embodiment, a topography analysis is performed on the design data file. The topography analysis may be similar to that (step 317$_1$) described in FIG. 3. For example, the topography analysis determines cumulative topography information of the various layers or mask levels of the IC. The topography analysis may be facilitated by a topography simulator.

In one embodiment, the topography analysis generates full chip topography maps for the different mask levels of the chip. For example, a full chip topography map indicates the topography of the resist in the respective mask level. The map may be divided into map or topography regions, having respective heights. The topography regions, for example, may be rectangular in shape. For example, the shape of the topography regions may be square shaped. Other shapes for the regions may also be useful. Colors may be used to indicate heights. For example, colors can be used to facilitate visual height identification of the different regions of the topography map. Other types of indicators may also be useful.

A height of a map region is relative to a baseline region with a baseline height. In one embodiment, the baseline region is the region with the lowest height of the topography maps. Other types of regions may be designated as the baseline region. For example, a region with an intermediate height, between the highest and lowest regions, may be assigned as the baseline region. The baseline height of the baseline region may be assigned a baseline value of 0, irrespective of its absolute height. For example, the baseline region is assigned a relative baseline height of 0. Providing other baseline height values may also be useful. The regions, for example, may be rectangular in shape.

A Boolean function is performed at step 520. In one embodiment, the Boolean function is performed on the topography maps generated from the topography analysis. The Boolean function includes defining a set of bins with different height ranges. For example, a bin may cover a height differential range of 50 Å. The height differential range, for example, may be determined by best focus variation with respect to topography. Other factors may be used to determine height differential ranges. Preferably, the set of bins have the same height differential range. Other configuration of bins, including different ranges or bins of a set having different ranges, may also be useful. The number of bins in the set should be sufficient to accommodate the highest height differential from the baseline height. For example, if the height differential in the topography maps between the baseline and the greatest height is 380 Å, then 8 bins are needed for the case where the bins of the set all have a differential range of 50 Å. Other configuration of bins may also be useful. The bins serve as height classifications. Table 4 below shows an example of a set of bins with 50 Å range differentials:

TABLE 4

| Bin Number | Height Range (Å) |
|---|---|
| Bin 0 | 0-49 |
| Bin 1 | 50-99 |
| Bin 2 | 100-149 |
| Bin 3 | 150-199 |
| Bin 4 | 200-249 |
| Bin 5 | 250-299 |
| Bin 6 | 300-349 |
| Bin 7 | 350-399 |

The Boolean function compares the various regions of the topography maps and allocates or bins them to the respective bins in the set of bins based on height. For example, if a region has a height within the range of 100-149 Å, it is assigned to Bin 2. In one embodiment, all topography maps are analyzed, binning map regions into their appropriate bins or classifications. The binning may be performed mask level by mask level.

In one embodiment, the Boolean function may be part of a CMP simulation package script used to perform the topography analysis. The simulation package inserts topography bin markers in the design data file. For example, a binned design data file is formed by the simulation package. The bin markers indicate the topography regions in the design data file and which bin they belong. The binned design data file includes bin markers which contain information indicating the topography and location of the binned regions of the different layers within the reticle. For example, the bin markers include coordinates of the binned region. The location of the bins may alternatively be provided in an output file, such as an RDB file.

In one embodiment, pre-OPC processing is performed. Pre-OPC processing, for example, includes associating bins with an initial target lithographic defocus value. For example, the baseline bin is assigned a baseline focus value while others are defocused relative to the baseline focus value. The baseline focus or defocus value may have an absolute defocus value, but is assigned a relative baseline focus or defocus value of 0 while other bins are adjusted to have a defocus value relative to the relative baseline value. The defocus values, in one embodiment, are based on height range of the bins.

Other factors may also be used in addition to height to determine the defocus values. The defocus values may be derived from real line information. Deriving defocus values by other techniques may also be useful.

As discussed, binning also includes location information within a reticle or a chip. The binning information can be incorporated to provide defocus values across the wafer. For example, an OPC model may take into account of topography information within a chip and translate the information across the wafer. The defocus value may depend on topography within a chip as well as location of the chip within the wafer. The defocus value, for example, may be based on foundry lithography process and layer information of the line used in producing the devices.

Table 5 below shows an example of a set of bins covering a height differential range of 50 Å and the respective associated defocus values:

TABLE 5

| Bin Number | Height Range (Å) | Defocus Value (nm) |
|---|---|---|
| Bin 0 | 0-49 | 0 |
| Bin 1 | 50-99 | 5 |
| Bin 2 | 100-149 | 10 |
| Bin 3 | 150-199 | 15 |
| Bin 4 | 200-249 | 20 |
| Bin 5 | 250-299 | 25 |
| Bin 6 | 300-349 | 30 |
| Bin 7 | 350-399 | 35 |

The defocus values provided are exemplary. The defocus values are defined based on heights of the bin. The topography bin markers in the binned design data file are used to represent defocus information.

In one embodiment, pre-OPC processing includes employing the binned design data files to perform process window optical proximity correction (PWOPC). To perform PWOPC, different PWOPC models may be employed using different process conditions. The PWOPC models may be standard OPC models. The PWOPC models may take into account of topography information. Other configurations of the PWOPC model may also be useful. The simulated results enable determination of baseline conditions for printing fidelity and to prevent process variation caused failures. The PWOPC may be used to develop or adjust defocus targets for OPC. Furthermore, by the binned design data, files may be employed to adjust fill generation rules prior to OPC. For example, fill generation rules may take into account the topography information of the binned data files.

Optical proximity correction (OPC) is performed at step 530. For example, OPC is performed on the binned data file. In one embodiment, the OPC is performed using a model-based OPC simulator. Other types of OPC simulators may also be useful. The binned design data file is provided to the OPC simulator for OPC. The OPC simulator adjusts the shape of the patterns, accounting for proximity effects to achieve the desired shape on the patterned resist layer. In one embodiment, OPC adjusts the shape of the patterns based on defocus values associated with the binning of the region. For example, regions are adjusted based on the respective defocus values provided to the OPC simulator. OPC is performed for all mask levels. For example, OPC is performed mask level by mask level.

OPC creates an adjusted design data file at step 540. For example OPC creates an adjusted design data file in GDS format, such as GDSout. Providing adjusted design data file in other formats may also be useful. In one embodiment, the GDSout file is provided without bin marker information. Providing a GDSout file with bin marker information may also be useful.

At step 550, verification is performed on the adjusted design data file. The verification, in one embodiment, includes ORC. ORC, for example, checks to determine whether the adjusted patterns produce the desired resist patterns. If verification passes at step 560, the process proceeds to step 570. For example, if the ORC determines that the adjusted patterns produce the desired resist patterns, this indicates that the verification process is successful or has passed.

On the other hand, if the verification fails at step 560, the process returns to step 530. For example, if the adjusted patterns do not produce the desired resist patterns, the verification has failed. Failed regions associated with a bin or bins of the set are identified. Bin or bins associated with failed regions are retargeted for OPC. For example, defocus values may be adjusted for OPC in the failed regions. The process from step 530 to step 560 repeats until verification is successful. Other verification processes may also be included. For example, verification may also include DRC or other types of verification processes.

At step 570, after successful verification of the adjusted design data file, a mask set is produced. For example, the mask set is produced by a mask shop based on the adjusted design data file. The mask set is used to process a wafer for forming a plurality of devices or ICs in parallel.

Figure 6:
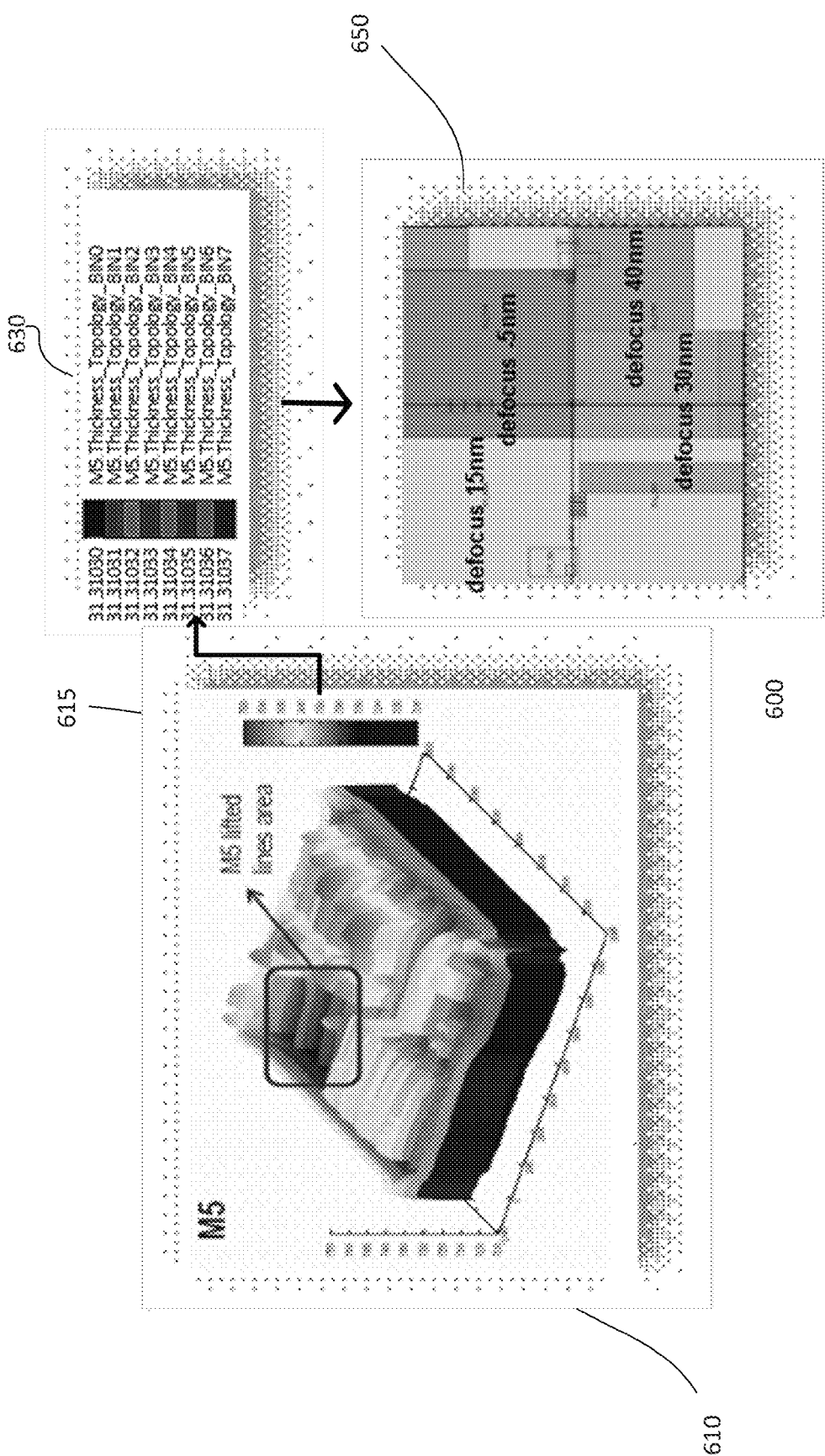
FIG. 6 graphically depicts a portion of an embodiment of a RE process.

FIG. 6 graphically illustrates a portion 600 of an embodiment of a RE process. The portion includes a topography map 610. The topography map corresponds to an upper mask level with accumulated topographical effects of lower levels. As illustrated, the topography map corresponds to M5 (metal level 5). The topography map includes regions having different heights. The different regions include different colors corresponding to colors on a color bar 615.

Bin definitions 630 are provided. As shown, 8 bins are defined in association with a color of the color key and their heights. In one embodiment, the bins have a height differential range of 50 Å. For example, the bins correspond to those described in Table 4.

A plan view 650 of the topography map for M5 with regions defined and associated defocus values for OPC is shown. The defocus values are used by the OPC tool to adjust the patterns in respective regions.

As described, OPC takes topography of the device into account. This enables an understanding of the design topography and to take topography into consideration during OPC. For example, OPC is corrected to adjust topography effect in a real process prior to fabricating the mask set. Adjustments to OPC to accommodate topography effects do not have process window limitations. This results in cost savings from avoiding the need to rework masks from topography issues. Additionally, mask fabrication turn-around time may be decreased.

Topography information may be employed to facilitate process window qualification (PWQ). For example, the design data file from which a mask set is based may be used to facilitate PWQ. Using topography information to facilitate PWQ may be referred to as topography driven lithography (TDL).

Figure 7:
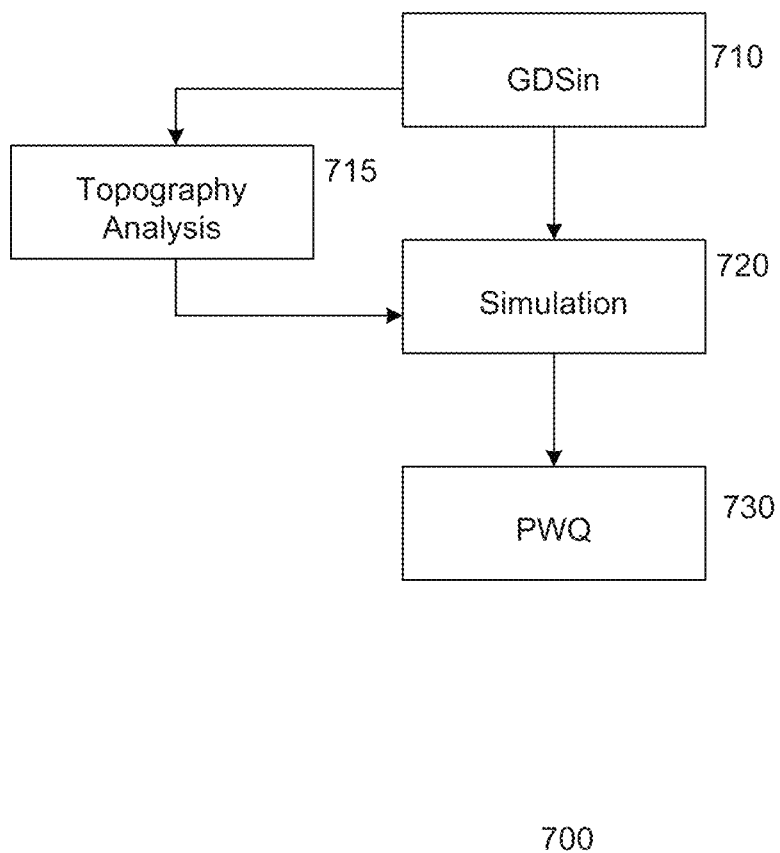
FIG. 7 shows an embodiment of a topography driven lithography (TDL) process.

FIG. 7 shows an embodiment of a TDL process 700. At step 710, a design data file is provided. The design data file, for example, is the design data file from which a mask set is produced. For example, OPC has been performed on the design data file and passed ORC check. The design data file, for example, can be a GDSII format file. Providing design data files in other formats may also be useful. For example, the design data file may be in an OASIS format or place and route databases, including open access or Milkyway from Synopsys. Other suitable formats may also be useful.

In one embodiment, the design data file is an unenhanced design data file and which has not been processed with a topography analysis for OPC. Providing a design data file which has been enhanced, as described in FIG. 3 and/or include topography analysis for OPC, as described in FIG. 5, may also be useful.

The design data file is analysed at step 715. In one embodiment, a topography analysis is performed on the design data file. The topography analysis may be similar to that described in FIG. 3 and FIG. 5. For example, the topography analysis determines cumulative topography information of the various layers or mask levels of the IC. The topography analysis may be facilitated by a topography lithography simulator.

In one embodiment, the topography analysis generates full chip topography maps for the different mask levels of the chip. For example, a full chip topography map indicates the topography of the resist in the respective mask level. The map may be divided into map or topography regions, having respective heights. The topography regions, for example, may be rectangular in shape. For example, the shape of the topography regions may be square shaped. Other shapes for the regions may also be useful. Colors may be used to indicate heights. For example, colors can be used to facilitate visual height identification of the different regions of the topography map. Other types of indicators may also be useful.

A height of a map region is relative to a baseline region with a baseline height. In one embodiment, the baseline region is the region with an intermediate height. For example, the baseline region may be the region with a height between the highest and lowest regions. The baseline region may have a height at about the middle of the range of the highest and lowest regions. The baseline region may be assigned a relative baseline height value of 0, irrespective of its absolute height. Regions having a height higher than the baseline region will have positive relative height values while regions having a height lower than the baseline region will have negative relative height values. Other types of regions may be designated as the baseline region. For example, a region with the lowest height may be designated as the baseline region.

At step 720, ORC simulation is performed on the topography maps. The ORC simulation considers topography effects and identifies lithographic hot spots based on the topography. For example, ORC uses appropriate defocus or topography models based on topography information from the topography analysis and identifies lithographic hot spots. Thresholds may be provided to determine lithographic hot spots. The thresholds may be based on the lithographic process information of the process line. For example the thresholds are determined from topography and pattern pairing information of the process line of a foundry or manufacturer. Topography information may also include transitions from a high to a low topography region or vice-versa.

The locations of the hot spots are known from the simulation. By knowing the locations of hot spots, lithographic process parameters for processing on a wafer can be determined for PWQ at step 730. Process parameters may include best focus. For example, best focus conditions can be determined for the different topographical regions. Other parameters which may affect best focus may also be taken into consideration. For example, inter and intra die CD variations of mask 3D effects may also be considered. This provides optimal lithography focus center, improving common process window.

Figure 8:
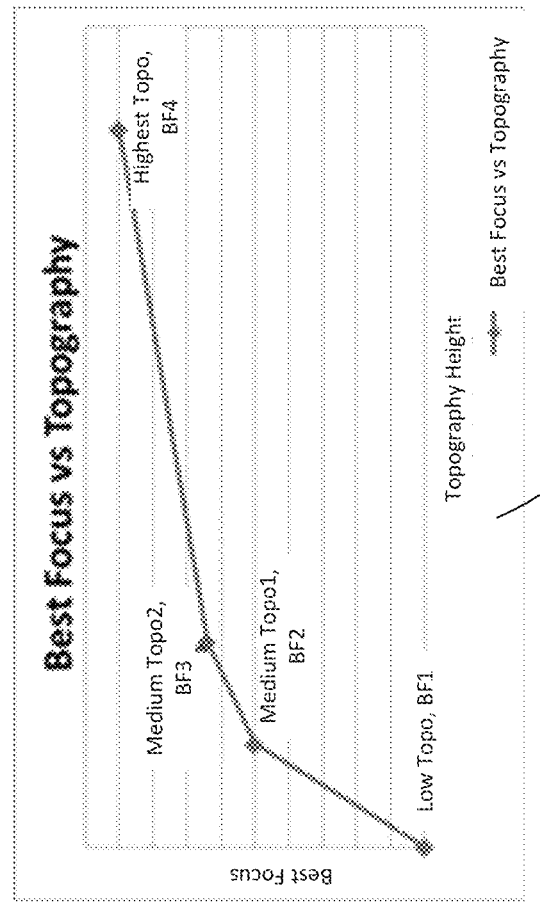
FIG. 8 shows results of process window qualification (PWQ) for different topography region.
Figure 8:
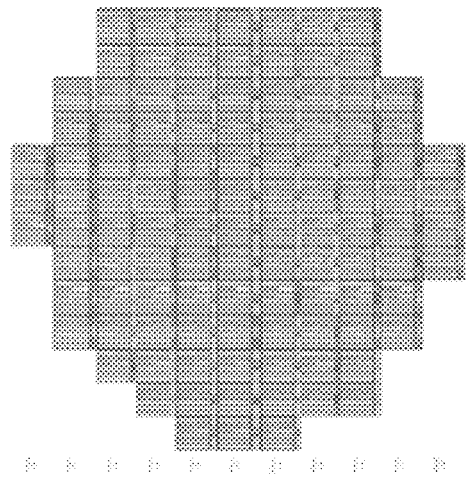

FIG. 8 shows PWQ for different topography level of a wafer 810. As shown, PWQ is performed for a low topography, low-medium topography (Topo1), high-medium topography (Topo2) and high topography regions. As can be seen from graph 820, best focus (BF) varies with topography. Clearly, this evidences that topography has an impact on BF.

After PWQ, process parameters are determined. The process parameters are employed in lithographic processes using the masks of the mask set to process a wafer for forming a plurality of devices or ICs in parallel.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method for forming a device comprising:
    providing a design data file of an integrated circuit (IC);
    performing topography analysis on the design data file by using a topography module, wherein the analysis comprises generating topography maps for mask levels of the IC based on accumulative topography profile for different mask levels separating a mask level into topography regions based on relative heights, wherein topography maps comprise topography regions;
    performing optical proximity correction (OPC), by using an OPC module, on the design data file with topography information from the topography analysis, wherein the OPC adjusts patterns of the mask levels based on defocus values associated with topography regions, the OPC produces an adjusted design data file;
    generating a mask set from the adjusted design data file; and
    processing a wafer to form devices using the mask set.

2. The method of claim 1 wherein:
    the topography regions of a respective mask level are based on a baseline topography region of the respective mask level;
    the baseline topography region of the respective mask level is assigned a baseline height value of 0 and heights of other topography regions are based on relative heights based on the relative baseline height; and
    the topography analysis further comprises binning regions based on relative height of the respective mask level.

3. The method of claim 2 wherein the relative height comprises a height range.

4. The method of claim 3 wherein the baseline region comprises a region with an intermediate height between the highest and lowest heights of the regions of the respective mask level.

5. The method of claim 3 wherein the baseline region comprises a region with the lowest height of the respective mask level.

6. The method of claim 1 wherein the defocus values of the topography regions are based on height range of bins.

7. The method of claim 6 wherein the defocus values are based on real line information.

8. The method of claim 1 comprising performing pre-OPC processing, wherein pre-OPC processing comprises performing process window OPC (PWOPC), wherein PWOPC is derived from topography information.

9. The method of claim 1 comprising performing pre-OPC processing, wherein pre-OPC processing comprises adjusting fill generation rules, wherein fill generation rules take into account topography information.

10. A method for forming a device comprising:
providing a design data file of an integrated circuit (IC);
performing topography analysis on the design data file by using a topography module, wherein the analysis comprises
generating accumulative topography profile for different mask levels,
separating a mask level into topography regions based on relative heights, and
generating topography maps for mask levels of the IC, and wherein the topography maps comprise topography regions;
performing optical proximity correction (OPC) by using an OPC module, on the design data file with topography information from the topography analysis, wherein the OPC adjusts patterns of the mask levels based on defocus values associated with topography regions, the OPC produces an adjusted design data file;
generating a mask set from the adjusted design data file; and
processing a wafer to form devices using the mask set.

11. The method of claim 10 wherein topography regions of a respective mask level are based on a baseline topography region of the respective mask level.

12. The method of claim 11 wherein the baseline topography region of the respective mask level is assigned a baseline height value of 0 and heights of other topography regions are based on relative heights based on the relative baseline height.

13. The method of claim 12 wherein the topography analysis further comprises binning regions based on relative height of the respective mask level.

14. The method of claim 12 wherein the baseline region comprises a region with the lowest height of the respective mask level.

15. The method of claim 12 wherein the baseline region comprises a region with an intermediate height between the highest and lowest heights of the regions of the respective mask level.

16. A method for making a mask set comprising:
providing a design data file of an integrated circuit (IC);
performing topography analysis on the design data file by using a topography module, wherein the analysis comprises generating topography maps for the mask levels of the IC based on accumulative topography profile for different mask levels, wherein the topography maps comprise topography regions;
performing optical proximity correction (OPC) by using an OPC module, on the design data file with topography information from the topography analysis, wherein the OPC adjusts patterns of the mask levels based on defocus values associated with topography regions, the OPC produces an adjusted design data file, wherein the defocus values of the topography regions are based on height range of bins; and
generating a mask set from the adjusted design data file.

17. A system for reticle enhancement of a design data file of an integrated circuit comprising:
a topography analysis module for performing topography analysis on the design data file, the topography analysis comprises generating topography maps of mask levels of the IC with topography regions;
a binning module for providing bin markers to the topography regions to the design data file to form a binned design data file; and
an optical proximity correction (OPC) module for performing OPC on the binned design data file, wherein the OPC adjusts patterns of the mask levels based on defocus values associated with topography regions, the OPC produces an adjusted design data file.

18. A method for forming a device comprising:
providing a design data file of an integrated circuit (IC);
performing topography analysis on the design data file by using a topography module, the analysis comprises
generating topography maps for mask levels of the IC, wherein topography maps comprise topography regions,
analyzing the design data file to generate accumulative topography profile for different mask levels, and
separating a mask level into topography regions based on relative heights, wherein the relative height comprises a height range; and
generating a mask set from the design data file.

19. The method of claim 18 comprising:
performing optical rule check (ORC) simulation on the design data file, wherein the ORC determines topography hot spots based on topography of the respective mask levels;
performing process window qualification (PWQ) to determine process parameters for the mask levels based on the topography hot spots, wherein the process parameters comprise best focus conditions and other lithographic process parameters; and
processing a wafer to form devices using the mask set and process parameters from PWQ.

20. The method of claim 19 wherein:
the topography regions of a respective mask level are based on a baseline topography region of the respective mask level;
the baseline topography region of the respective mask level is assigned a baseline height value of 0 and heights of other topography regions are based on relative heights based on the relative baseline height; and
the topography analysis further comprises binning regions based on relative height of the respective mask level.

21. The method of claim 20 wherein the baseline region comprises a region with an intermediate height between the highest and lowest heights of the regions of the respective mask level.

22. The method of claim 20 wherein the baseline region comprises a region with the lowest height of the respective mask level.

* * * * *